United States Patent Office 3,408,415
Patented Oct. 29, 1968

3,408,415
CATALYTIC HYDROGENATION
Frederick S. Dovell, Naugatuck, and Harold Greenfield, Watertown, Conn., assignors to Uniroyal, Inc., a corporation of New Jersey
No Drawing. Filed Sept. 20, 1965, Ser. No. 488,757
5 Claims. (Cl. 260—666)

ABSTRACT OF THE DISCLOSURE

This application discloses a method of selectively hydrogenating acyclic and cyclic conjugated diolefins to the corresponding monoolefins. The catalysts employed are sulfides of platinum metals and particularly sulfides of platinum, palladium and ruthenium.

---

The present invention relates to catalysis and more particularly concerns a process for catalyzing the selective hydrogenation of conjugated diolefins to corresponding monoolefins.

Three of the most important types of catalysts that are generally used to selectively hydrogenate conjugated diolefins to monoolefins are:

(1) Palladium catalysts which suffer from a lack of sufficient selectivity (there is too much conversion to the saturated hydrocarbon) and the need for a sulfur-free feed; and (2) Base metal sulfide catalysts, such as the sulfides of nickel, cobalt and molybdenum, which suffer from the need for severe and expensive operating conditions; and (3) Copper chromite catalysts which suffer from a lack of sufficient selectivity, the need for a sulfur-free feed and the necessity of operating under somewhat severe conditions of temperature and pressure.

The platinum metal sulfides, that is, the sulfides of ruthenium, rhodium, palladium, osmium, iridium and platinum are disclosed as catalysts for certain types of hydrogenation reactions in our copending application Ser. No. 264,691, filed Mar. 12, 1963 now United States Patent 3,336,386 issued Aug. 15, 1967, and in the corresponding Belgian Patent 643,911 issued Feb. 17, 1964. The platinum metals are the six metals (listed above) in Group VIII, Periods 5 and 6 of the Periodic Table. The noble metals are often considered to include gold and silver as well as the aforementioned six metals. In order to avoid confusion, the term platinum metals will be used throughout the specification as it is the term well recognized by those engaged in the art of catalysis as identifying the above listed six metals (Encyclopedia of Chemical Technology, vol. 10, pp. 819–59 (Interscience, 1953)).

The present invention comprises the use of the sulfides of the platinum metals as heterogeneous hydrogenation catalysts for the reduction of diolefins to monoolefins. The advantages of the catalysts of this invention over those previously used in the art are several. Firstly, the catalysts of this invention provide a degree of desired selectivity hitherto unattainable in the hydrogenation of diolefin.

Secondly, these platinum metal sulfide catalysts are relatively insensitive even to those sulfur-containing compounds that severely inhibit most other catalysts. Thus, catalysts of this invention may be used with sulfur-containing feeds and do not require the use of purified hydrogen. Indeed, the platinum metal sulfide catalysts may be used for the hydrogenation of compounds containing one or more sulfur atoms in the molecule. Their relative insensitivity to sulfur insures a long life at a high level of activity, even after long exposure thereto.

By way of comparison, the poisoning of conventional hydrogenation catalysts by even small amounts of sulfur, hydrogen sulfide, or other compounds containing sulfur linkages is discussed in many references including Journal of the American Chemical Society, volume 70, page 1392 (1948); "Reactions of Hydrogen with Organic Compounds" by H. Adkins (University of Wisconsin Press, 1937), page 22; "Catalysis" by Berkman, Morrell, and Egloff (Reinhold Publishing Corp., 1940), pages 391–393. Sulfur poisoning of specific catalysts is discussed with respect to copper and Raney nickel catalysts in Industrial & Engineering Chemistry, volume 52, page 417 (1960) and volume 33, page 1373 (1941), respectively.

Thirdly, platinum metal sulfide catalysts are far more active for many hydrogenation reactions than the metal sulfide catalysts previously known in the art, and therefore are suitable for reactions that must be run at relatively low temperatures to avoid undesirable side reactions.

And fourthly, the catalysts of this invention have the economically desirable advantage of being effective at relatively low pressures.

The platinum metal sulfide catalysts can be prepared by reaction of appropriate compounds of the metals (e.g., $OsO_4$, $IrCl_3$) with solutions of alkali, alkaline earth or ammonium sulfides, hydrosulfides or polysufides; by treatment of solutions of appropriate compounds of the metals (e.g., $H_2PtCl_6 \cdot H_2O$, $PdCl_2 \cdot 2H_2O$) in dilute acids with hydrogen sulfide; by reaction of the metal itself with hydrogen sulfide, other sulfur-containing compounds, or elemental sulfur; and by other methods obvious to those skilled in the art of catalyst preparation. The catalyst may be prepared in situ or preformed, i.e., added to the hydrogenation reaction mixture after prior preparation and isolation. Further, the catalyst may be prepared and used as a bulk powder or supported on a suitable carrier, such as carbon or alumina; and, whether supported or not, may be prepared and used as a powder for liquid phase slurry and for vapor phase fluidized reactions, or as a pellet for liquid or vapor phase fixed bed operations.

The platinum metal sulfide catalysts used in the present process may be prepared by the methods disclosed in our copending application Ser. No. 264,691, filed Mar. 12, 1963, now U.S. Patent 3,336,386 issued Aug. 15, 1967, and the corresponding Belgian Patent 643,911 issued Feb. 17, 1964.

The platinum metal sulfides that are preferred in the present process are the sulfides of platinum, palladium and ruthenium.

An object of this invention is to provide a process for catalyzing the *selective* hydrogenation of *conjugated diolefins* to corresponding *monoolefins* and only a minor or negligible proportion of corresponding *saturated* hydrocarbons. Another object is to provide a catalyzed process for removing diolefins from olefin feeds presently being used for gasoline manufacture and for polymerization processes, particularly for removing 1,3-butadiene from butene feeds.

A further object is to provide a hydrogenation process using catalysts which are highly selective, do not require sulfur-free feeds, and are effective under very mild conditions of temperature and pressure.

The process of the instant invention comprises the use of platinum metal sulfides as a catalyst for the selective hydrogenation of conjugated diolefins to corresponding monoolefins.

The conjugated diolefins that may be selectively hydrogenated by the present process include acylic, such as 1,3-butadiene, 1,3-pentadiene (piperylene), 2-methyl-1,3-butadiene (isoprene) and 2,3-dimethyl-1,3-butadiene, and cyclic such as 1,3-cyclopentadiene, 1-methyl-4-isopropyl-1,3-cyclohexadiene (alpha-terpinene), 1-methyl-5- isopropyl-1,3-cyclohexadiene (alpha-phellandrene) and 1,3-cyclooctadiene. The presence of sulfur or sulfur compounds in the feed will not inactivate (poison) the catalyst of this invention.

The catalyzed hydrogenation reactions of our invention may be run at temperatures ranging from about 50° to 350° C. or other temperatures as high as the stability of the reactants will permit. The preferred temperature range being from 100° C. to 200° C. The pressures employed may range from about 50 p.s.i.g. to 1000 p.s.i.g. or even to several thousand p.s.i.g. with a preferred pressure of from 50 p.s.i.g. to 500 p.s.i.g. The exact conditions of operation selected will depend, of course, on the nature of the hydrogenation reaction being carried out as well as on the optimum economic combination of temperature, pressure, catalyst level and cycle time. As determined by extrapolation from the examples, quantitative or almost quantitative reactions may often be achieved with as low a weight ratio of catalyst (bulk or supported) to reactant to be hydrogenated as 0.001.

When operating a hydrogenation process on a continuous basis the catalyst level is more correctly stated in terms of weight hourly space velocity (WHSV), that is, the weight of feed stock per weight of catalyst per hour. In practicing the present invention the WHSV may be in the range of about 0.1 to 100 with a preferred range of about 0.5 to 25. Again the exact operating conditions selected will depend on the optimum economic combination of pressure, temperature and weight hourly space velocity.

The reactions may be carried out in either batch or continuous systems with either tank or pipe-line type reactors, and in the liquid phase with slurry or fixed bed catalysts or in the vapor phase with either fluidized or fixed bed catalysts, according to procedures well known to those skilled in the art. When the reaction is carried out in the liquid phase, it may be desirable to employ an inert solvent to control the heat of reaction. Any nonreacting solvent in which the feed stock has some solubility may be used.

The following examples illustrate the practice of our invention.

EXAMPLE 1

Liquid butadiene was metered from a stainless-steel reservoir by a calibrated positive displacement pump. Both the reservoir and the pump were kept at a temperature below about −15° C. Hydrogen was taken from a commercial cylinder. Its flow rate was controlled by a needle valve and measured by a calibrated flowmeter. The total pressure was controlled by means of a back-pressure regulator.

The hydrogen and butadiene flowed into the same block and then into the reactor. The reactor consisted of a 20-inch length of Schedule 80, type 304 stainless-steel, 1-inch pipe with five silver-soldered thermowells and high-pressure fittings on both ends. The first 10 inches was filled with stainless-steel sponge and functioned as a preheater. This was followed by an 8-inch catalyst zone. The preheat and catalyst-bed sections had separately controlled electric tape heaters. In addition, the catalyst zone was wrapped with tubing for water-cooling. Products were condensed and collected in a stainless-steel receiver at about −40° C.

In runs A–C, the catalyst zone was filled with 100 ml. (about 90 g.) of ⅛-inch pelleted catalyst. In runs D–I, the catalyst zone contained 10 ml. (about 9 g.) of ⅛-inch pelleted catalyst centered in the zone and preceded and followed by glass beads to fill the rest of the catalyst zone. One thermocouple was at the center of the catalyst bed. In run J, the 10 ml. of pelleted catalyst was replaced with 10 ml. (about 3 g.) of a powdered catalyst.

The results are given in Table I. Analyses were by gas-liquid chromatography.

TABLE I.—HYDROGENATION OF BUTADIENE

| Run No. | Catalyst | Temp., °C. | Pressure, P.s.i.g. | Flow Rate, mole/min. Hydrogen | Flow Rate, mole/min. Butadiene | Percent Conversion | Mole Percent Yield [f] Butane | Mole Percent Yield [f] Butenes | WHSV, Wt. butadiene/Wt. catalyst/hr. |
|---|---|---|---|---|---|---|---|---|---|
| A | 0.5% Pt on alumina [a] | 41 | 100 | 0.10 | 0.0026 | 100 | 99 | 1 | 0.0936 |
| B | | 74 | 100 | 0.10 | 0.0026 | 100 | 100 | 0 | 0.0936 |
| C | | 48 | 50 | 0.10 | 0.0026 | 94 | 82 | 18 | 0.0936 |
| D | 0.1% Pt on alumina [b,c] | 69 | 100 | 0.10 | 0.010 | 8 | 33 | 67 | 3.6 |
| E | | 78 | 100 | 0.10 | 0.010 | 19 | 28 | 72 | 3.6 |
| F | 0.5% Pt sulfide on alumina [b,d] | 210 | 100 | 0.14 | 0.0064 | 13 | 0 | 100 | 2.3 |
| G | | 221–232 | 100 | 0.14 | 0.0064 | 73 | Trace | ca. 100 | 2.3 |
| H | 0.5% Pd sulfide on alumina [b,d] | 201 | 100 | 0.14 | 0.013 | 7 | 0 | 100 | 4.7 |
| I | | 207–214 | 100 | 0.14 | 0.013 | 19 | 0 | 100 | 4.7 |
| J | 5% Ru sulfide on carbon [d,e] | 194 | 100 | 0.14 | 0.013 | 8 | 0 | 100 | 14.1 |

[a] About 90 grams of ⅛ inch pellets. [b] About 9 grams of ⅛ inch pellets. [c] Poisoned by 0.02 mole thiophene per mole butadiene in the butadiene feed. [d] Feed contained 5×10⁻⁴ mole/min. of hydrogen sulfide to maintain catalyst in sulfided condition. [e] About 3 grams of powdered catalyst. [f] Based on converted butadiene. All analyses were by gas-liquid chromatography.

The ratios of 2-butenes to 1-butene were much lower than the equilibrium values [J. E. Kilpatrick, E. J. Prosen, K. S. Pitzer and F. D. Rossini, J. Res. Natl. Bur. Standards, 36, 559 (1946)], indicating that the 1-butene was formed as a primary product.

The desired selectivity in Example 1 is the conversion of butadiene to butenes with a minimum of butane formation.

Runs A–C show very poor selectivity for platinum. As expected, the rate, as measured by butadiene conversion, decreased with decreasing pressure of hydrogen; at the same time, the selectivity increased (compare runs A and C) but still was quite poor.

Runs D and E with a partially sulfur-poisoned platinum show that poisoning has markedly improved the selectivity of the platinum, but the selectivity still is far from adequate. This phenomenon of increasing selectivity by means of partial poisoning is well known in the art.

Runs F and G show perfect selectivity for platinum sulfide. All of the converted butadiene has been transformed into butenes with little or no formation of butane. Thus, the order of selectivity is platinum sulfide >> poisoned platinum > platinum. Note the very great difference in activities, as reflected by operating temperatures, between the sulfided catalyst (runs F and G) and the unsulfided catalysts, posioned (runs D and E) as well as unpoisoned (runs A–C).

Runs H and I show perfect selectivity for palladium sulfide. Run J shows perfect selectivity for ruthenium sulfide.

EXAMPLE 2

Each experiment was run with 0.10 mole of the mono-olefin or diolefin, 55 ml. of pentane (as solvent) and 1.85 grams of 5% platinum sulfide-on-carbon in a 170 ml. stainless-steel autoclave. After addition of the preceding compounds the autoclave was sealed and purged first with nitrogen and then with hydrogen. Hydrogen was added to the desired pressure, and the reaction mixture heated with agitation. At the end of the reaction, the autoclave was cooled and depressurized, and the reaction product removed. The catalyst was removed by filtration, and the products were quantitatively analyzed by gas-liquid chromatography. The results are summarized in Table II. The first experiment of Part B illustrates particularly well the selective hydrogenation of the conjugated diolefin, 1,3-cyclohexadiene, to the monoolefin, cyclohexene, with very low conversion to the saturated hydrocarbon, cyclohexane.

TABLE II

| Starting Olefin | Pressure, P.s.i.g. | Time at Temp., hrs. | Yields, mole percent | | |
|---|---|---|---|---|---|
| | | | Cyclohexadiene | Cyclohexene | Cyclohexane |
| Part A, 140° C., 1,3-cyclohexadiene | 625–750 | ½ | 0 | 93 | 7 |
| Cyclohexene | 720–770 | 1 | 0 | 63 | 37 |
| Part B, 110° C., 1,3-cyclohexadiene | 160–280 | 3½ | 4 | 95 | 1 |
| Cyclohexene | 285–295 | 3½ | 0 | 93 | 7 |
| Part C, 110° C., 1,4-cyclohexadiene | 265–290 | 3½ | ¹ 81 | 18 | 1 |

¹ Of the 81 parts remaining as cyclohexadiene, 4 parts were converted to 1,3-cyclohexadiene.

The data in Part A of Table II show that at rather high temperatures and pressures, removal of the conjugated diolefin 1,3 - cyclohexadiene from the feed is quantitative with only 7% of the feed being converted to the saturated cyclohexane. By way of comparison, only 37% of the pure cyclohexene feed is converted to the saturated cyclohexane in twice the time.

The data in Part B show that, at economically desirable low temperatures and pressures, removal of the conjugated diolefin 1,3 - cyclohexadiene from the feed is almost quantitative (96% yield) in 3½ hours. Just a little over 1% of the initial amount of diolefin is converted into the saturated cyclohexane. By way of comparison, only 7% of the pure cyclohexene feed is converted to the saturated cyclohexane (at just slightly greater pressure).

The data of Part C show that, although the amount of cyclohexene formed is 18 times as great as the amount of saturated cyclohexane formed only about 19% of the unconjugated diolefin 1,4 - cyclohexadiene is reduced at all. (About 4% of the original diolefin feed is converted from the 1,4 - diene to the 1,3 - diene.) This shows the nonconjugated diolefin reacts very slowly with the catalyst of the present invention.

Having thus described our invention, what we claim to protect by Letters Patent is:

1. A method of selectively hydrogenating a conjugated diolefin selected from the group consisting of cyclohexadiene and butadiene to form the corresponding monoolefin comprising the steps of reacting the conjugated diolefin with hydrogen and a catalyst at a temperature of from 50 to 350° C. under a pressure of from 50 to 1000 pounds per square inch, said catalyst consisting of a supported or unsupported platinum metal sulfide selected from the group consisting of sulfides of platinum, palladium and ruthenium.

2. The method of claim 1 in which the temperature is from 100 to 200° C. and the pressure is from 50 to 500 pounds per square inch.

3. The method of claim 2 in which said catalyst is present in an amount such that the weight ratio of catalyst to conjugated diolefin is at least .001.

4. A method of selectively hydrogenating a conjugated diolefin selected from the group consisting of butadiene and cyclohexadiene comprising the steps of reacting the conjugated diolefin with hydrogen and a catalyst at a temperature of from 100 to 200° C. under a pressure of from 50 to 500 pounds per square inch, said catalyst consisting of a platinum metal sulfide selected from the group consisting of sulfides of platinum, palladium and ruthenium, said conjugated diolefins being brought into contact with said catalyst at a weight hourly space velocity of from 0.1 to 100.

5. The method of claim 4 in which the weight hourly space velocity is from 0.1 to 25.

References Cited

UNITED STATES PATENTS

| | | | |
|---|---|---|---|
| 3,336,386 | 8/1967 | Dovell et al. | 260—576 |
| 2,511,453 | 6/1950 | Barry | 260—677 |
| 3,309,307 | 3/1967 | Bryant | 260—667 |
| 2,402,626 | 6/1946 | Howk | 252—439 |
| 2,360,555 | 10/1944 | Evans et al. | 260—666 |
| 2,402,493 | 6/1946 | Greensfelder et al. | 260—683.9 |
| 2,488,145 | 11/1949 | Smith et al. | 260—683.9 |
| 2,497,176 | 2/1950 | Mason | 260—683.9 |
| 3,150,203 | 9/1964 | Shepherd | 260—683.9 |

DELBERT E. GANTZ, *Primary Examiner.*

V. O'KEEFE, *Assistant Examiner.*